United States Patent [19]
Clinton

[11] 3,777,259
[45] Dec. 4, 1973

[54] APPARATUS FOR DETERMINING THE RESISTANCE PER UNIT LENGTH OF A RESISTIVE CONDUCTOR

[76] Inventor: Henry H. Clinton, Walnut St., R.F.D. 1, Ivoryton, Conn. 06442

[22] Filed: Apr. 2, 1973
[21] Appl. No.: 347,357

[52] U.S. Cl. .................................. 324/62, 324/115
[51] Int. Cl. ............................................. G01r 27/02
[58] Field of Search .............................. 324/62, 115

[56] References Cited
UNITED STATES PATENTS 2,188,588  1/1940  Antranikian .................... 324/115 X
2,995,704  8/1961  Norgaard .......................... 324/62 R Primary Examiner—Stanley T. Krawczewicz
Attorney—Donald K. Huber

[57] ABSTRACT

A device is provided for testing resistive ignition wire to provide an indication of the resistance of such wire in terms of resistance units per unit length of wire under test. A manually operable adjustment knob has an associated dial calibrated in length units. When a wire of given length is to be tested, the adjustment knob is set to such length and an associated meter is thereby conditioned to provide a scale reading related directly to the resistance of the test wire per unit length thereof.

7 Claims, 2 Drawing Figures

APPARATUS FOR DETERMINING THE RESISTANCE PER UNIT LENGTH OF A RESISTIVE CONDUCTOR

BACKGROUND OF THE INVENTION

This invention relates to electrical measuring devices, and deals more particularly with such a device adapted to measure the resistance of a resistive wire and to provide an output reading directly related to the resistance of such wire per unit length.

In recent years, in automobile and other spark-ignited internal combustion engines increasing use has been made of ignition wires having relatively high conductor resistance. The widespread use of such resistive ignition wire has, however, posed maintenance problems since mechanics called upon to diagnose an ignition problem have had no simple and objective means to determine whether the ignition wiring may have been damaged or deteriorated to the point that it impaired engine performance. In particular, no simple means has been available to enable a mechanic to determine whether the resistance per unit length of an ignition wire lies within the range which has been found to be optimum for the application in question.

The purpose of this invention is, therefore, to provide a measuring device for testing resistive ignition wire and the like, which device is of relatively simple construction and can be produced inexpensively and which can be used easily by any mechanic without the need for special training.

SUMMARY OF THE INVENTION

This invention resides in an electrical measuring device for determining the resistance per unit length of a resistive conductor, such as a resistive ignition wire, and which includes two test probes adapted to be placed at the opposite ends of a wire under test. A series electrical circuit is connected between the two probes and consists of a battery and a resistance so that when the probes are placed across the test wire a voltage appears across the resistance. The resistance is comprised at least in part of a potentiometer adjustable by means of a manually operable knob movable relative to an associated dial. A volt meter is connected across the resistance and provides a scale reading related to the voltage drop across the resistance. The dial of the potentiometer is calibrated in units of length and in such a manner that when the potentiometer knob is moved to any setting relative to the dial the corresponding dial reading indicates the length of wire under test for which the volt meter will produce a predetermined scale reading if the wire under test has a given resistance per unit length. Therefore, the volt meter scale reading is indicative of resistance per unit length of the sample under test provided that the potentiometer knob is set to the length of such sample.

DETAILED DESCRIPTION OF THE PREFERRED EMBODIMENT

Figure 1:
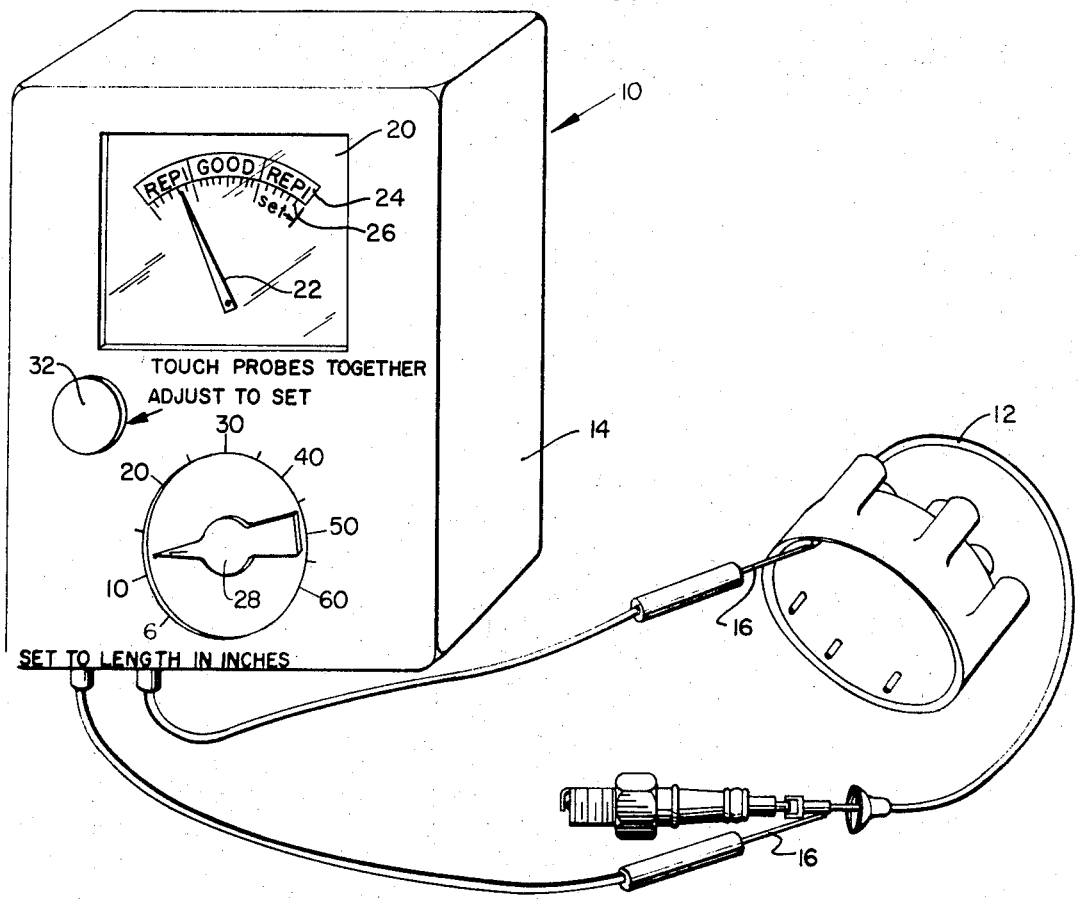
FIG. 1 is a perspective view showing a measuring device embodying this invention shown in use in measuring the resistance of an ignition wire.

Turning to the drawings, FIG. 1 shows a measuring device 10 embodying the present invention in use to test the resistance of an illustrated ignition wire 12. As seen in FIG. 1, the device 10 comprises a case 14 to which are connected two test probes 16, 16 adapted to be placed at opposite ends of the test wire 12. On the front face of the case is a window 18 through which are visible a meter scale plate 20 and an associated indicator needle 22. The illustrated scale plate 20 has two scales, one being a scale 24 which is divided into acceptable and unacceptable ranges of values and the other being a scale 26 which is calibrated in terms of resistance units per unit length of wire under test. Since the wire under test is usually measured in inches, the graduations will, therefore, usually be in terms of ohms per inch.

An adjustment knob 28 is also provided on the front face of the instrument case and cooperates with an associated dial 30 which is calibrated in length units. In particular, the illustrated dial is calibrated in inch units and covers a range of 6 inches to 60 inches. As explained hereinafter, when the knob 28 is set relative to the dial 30 so that the dial reading or knob setting corresponds to the length of the wire 12 under test, the indicator needle 22 of the instrument will indicate relative to either of the scales 24 or 26 the resistance of the test wire for each unit of its length.

Also included in the instruemnt 10, as shown in FIG. 1, is a zero adjust knob 32. Each time the instrument is used the two probes 16, 16 are first touched together and the zero adjust knob 32 adjusted until the meter needle 22 registers with the "set" marking on the scale plate 20, to thereby adjust the meter to the potential of the battery, as hereinafter described.

Figure 2:
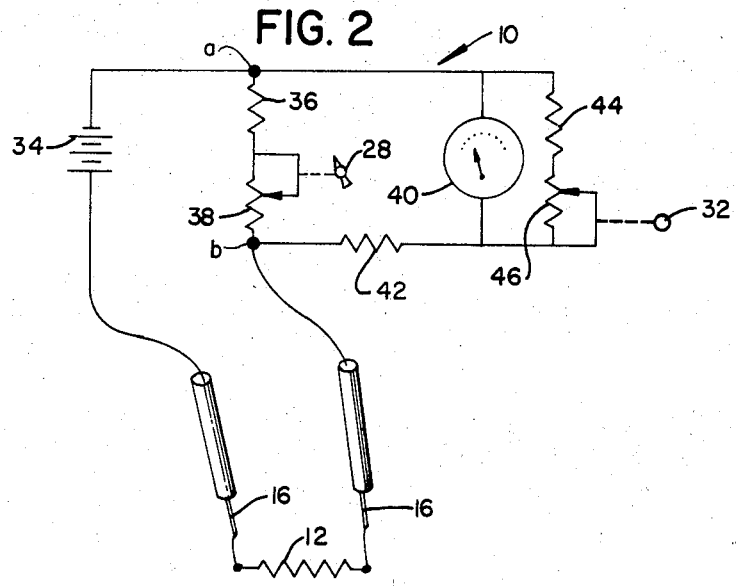
FIG. 2 is a schematic wiring diagram of the device of FIG. 1.

Turning to FIG. 2, the device 10, as to its electrical components, includes a battery 34. One side of the battery is connected directly to one of the probes 16, and between the other side of the battery and the other probe 16 is a measuring circuit. This measuring circuit is shown connected between the points $a$ and $b$ in FIG. 2. It consists of a first branch made up of a fixed resistor 36 and a potentiometer 38 in series with one another, the wiper of the potentiometer 38 being connected to the length adjustment knob 28 so as to be adjusted as a result of rotation of the knob 28. The measuring circuit also includes a second branch connected between the points $a$ and $b$ in parallel with the first branch. This second branch includes a current meter 40, preferably a microammeter and of which the scale plate 20 and needle 22 of FIG. 1 are a part, having a shunt resistance consisting of a series combination of a resistor 44 and a potentiometer 46 connected across its terminals. This combination of the meter 40, resistor 44 and potentiometer 46 is in turn connected across the points $a$ and $b$ in series with another resistor 42. The resistor 42 is of such a resistance value compared to that of the resistor 36 and potentiometer 38 that the current which passes through it is a relatively small percentage (about 5 percent or less) of the current flowing through the resistor 36 and potentiometer 38. The potentiometer 46 has its wiper connected to the zero adjust knob 32 of FIG. 1 and is moved by movement of such knob. The resistor 44 and potentiometer 46, therefore, provide a parallel path by which an adjustable part of the current through the resistor 42 can be diverted around the meter 40.

The dial 30 associated with the potentiometer 38 is graduated into divisions proportional to the equivalent single resistance provided by the measuring circuit between the points *a* and *b*. These divisions are in turn numbered to correspond with units of length of wire under test, as mentioned previously. The values of the resistance 36 and of the potentiometer 38 are so chosen that the equivalent single resistance of the measuring circuit at any setting of the potentiometer knob 28 is a fixed percentage (say 50 percent) of the nominal, or expected, resistance value of the sample wire under test if the sample wire has the length indicated by the dial.

To use the instrument 10, the probes 16, 16 are first touched together and while so connected together the zero adjust knob 32 is adjusted until the meter needle 22 reads full scale or registers with the set indication on the scale plate 20. The probes are then placed across the ends of the ignition wire under test and the length adjust knob 28 is adjusted to the length of the test wire in inches. If the resistance of the wire per unit length is exactly the expected nominal value, the meter will read 50 percent of full scale. If the resistance per unit length is less than the nominal value, the meter will read more than 50 percent of full scale; and if the resistance of the test wire is more than the nominal value, the meter will read less than 50 percent of full scale. Accordingly, it will be understood that the meter reading is indicative of resistance per unit length of the sample under test without regard to its length and, therefore, the scales of the meter such as shown at 26 and 24 may be related directly to the resistance per unit length and can be made to read either directly in such units, as is the scale 26, or can simply be graduated to indicate acceptable or unacceptable values, as is the scale 24.

As the voltage of the battery 34 decreases with age, the zero adjust resistor 46 must be increased in value to make the full scale setting. The calibration of the dial 30 is affected to only a negligible degree by such change in the value of the resistor 46 since the overall equivalent resistance interposed between the top of the battery 34 and the right-hand probe, as shown in FIG. 2, changes very little as a result of any change in the setting of the potentiometer 46.

It should also be noted that the potentiometer 38 is preferably one wherein the resistance varies substantially linearly with changes in the setting of the associated knob 28. When this is the case, the calibration of the associated dial 30 will be non-linear because of the current used to deflect the meter 40. The use of a non-linear scale further allows the use of a less sensitive and, therefore, less expensive current meter 40 and also allows the use of a battery 34 of smaller size and voltage thereby decreasing the overall cost of the instrument 10.

I claim:

1. A device for testing a length of resistive wire to determine the electrical resistance per unit length of said wire, said device comprising two probes adapted to be placed at opposite ends of a wire under test, a battery and a measuring circuit connected in series with one another between said two probes, said measuring circuit including a first branch comprised at least in part of a potentiometer having a manually operable knob movable relative to an associated dial for selectively varying the value of said resistance and a second branch connected in parallel with said first branch and including a current meter, said dial being calibrated in units of length and in such a manner that when said potentiometer knob is set to any selected point on said dial the corresponding dial reading indicates the length of wire under test which for such dial reading will produce a predetermined scale reading of said current meter if the wire under test has a given resistance per unit length.

2. A device as defined in claim 1 further characterized by said potentiometer being of the type wherein the resistance thereof varies substantially linearly with movement of said knob relative to said dial and said dial being calibrated non-linearly.

3. A device as defined in claim 1 further characterized by said resistance including a fixed resistor in series with said potentiometer.

4. A device as defined in claim 3 further characterized by a shunt resistance in parallel with said meter and including a second potentiometer for varying the value of said resistance in parallel with said meter.

5. A device as defined in claim 4 further characterized by said second branch including a resistor connected in series with said parallel combination of said meter and said shunt resistance.

6. A device as defined in claim 1 further characterized by said meter having a scale calibrated directly in terms of resistance units per length unit of wire under test.

7. A device as defined in claim 1 further characterized by said meter having a scale calibrated to indicate acceptable and unacceptable ranges of values.

* * * * *